US011132505B2

(12) United States Patent
Chu et al.

(10) Patent No.: US 11,132,505 B2
(45) Date of Patent: Sep. 28, 2021

(54) CHINESE COMPOSITION REVIEWING SYSTEM

(71) Applicant: CULTURE COM TECHNOLOGY, LIMITED, Hang Kei Garden (MO)

(72) Inventors: Bong-Foo Chu, Hang Kei Garden (MO); Hung-Lien Shen, Hang Kei Garden (MO)

(73) Assignee: CULTURE COM TECHNOLOGY (MACAU), LIMITED, Hang Kei Garden (MO)

( * ) Notice: Subject to any disclaimer, the term of this patent is extended or adjusted under 35 U.S.C. 154(b) by 168 days.

(21) Appl. No.: 16/547,644

(22) Filed: Aug. 22, 2019

(65) Prior Publication Data

US 2021/0056166 A1 Feb. 25, 2021

(51) Int. Cl.

| | |
|---|---|
| ***G06F 40/232*** | (2020.01) |
| ***G06F 40/53*** | (2020.01) |
| ***G06F 40/169*** | (2020.01) |
| ***G06F 40/253*** | (2020.01) |
| ***G06F 40/129*** | (2020.01) |

(52) U.S. Cl.

CPC .......... *G06F 40/232* (2020.01); *G06F 40/129* (2020.01); *G06F 40/169* (2020.01); *G06F 40/253* (2020.01); *G06F 40/53* (2020.01)

(58) Field of Classification Search

CPC .................................................. G06F 16/3344
USPC ........................... 704/1, 9, 10, 257, 270–275
See application file for complete search history.

(56) References Cited

U.S. PATENT DOCUMENTS

| | | | | |
|---|---|---|---|---|
| 9,087,047 | B2 * | 7/2015 | Nagase | G06F 40/129 |
| 2014/0052436 | A1 * | 2/2014 | Qian | G06F 40/129 704/9 |
| 2017/0293604 | A1 * | 10/2017 | Zhu | G06F 40/274 |
| 2018/0364905 | A1 * | 12/2018 | Putko | G06F 3/0237 |

FOREIGN PATENT DOCUMENTS

| | | | | |
|---|---|---|---|---|
| CN | 1442787 | A | * | 9/2003 |
| JP | 2001229162 | A | * | 8/2001 |

* cited by examiner

*Primary Examiner* — Jesse S Pullias
(74) *Attorney, Agent, or Firm* — Amin, Turocy & Watson, LLP

(57) ABSTRACT

A Chinese composition reviewing system is provided and includes an identifying module, an analyzing module and a comprehending module. The identifying module identifies an abnormal phrase and an inappropriate punctuation mark of a target content by dividing a Chinese character into a Cangjie code. The analyzing module analyzes a sentence state of the target content and provides reference information when analyzing the sentence state. The comprehending module parses the target content via a predefined article mode, where the predefined article mode includes at least one of an article style, a word count, a paragraph count, a sentence count and a critical element. The Chinese composition reviewing system can evaluate the target content automatically.

10 Claims, 2 Drawing Sheets

CHINESE COMPOSITION REVIEWING SYSTEM

BACKGROUND

1. Technical Field

The present disclosure relates to artificial intelligence techniques, and, more particularly, to a Chinese composition reviewing system that reviews an article automatically.

2. Description of the Prior Art

Currently, a Chinese composition in an exam is reviewed personally.

As a number of exam-takers increases, an examiner has to review a great number of compositions. The examiner will get tired gradually, and does not grade the compositions fairly.

Therefore, how to solve the problem of the prior art is becoming an urgent issue in the art.

SUMMARY

In view of the drawbacks of the prior art, the present disclosure provides a Chinese composition reviewing system, comprising: an identifying module configured for identifying an abnormal phrase and an inappropriate punctuation mark of a target content by dividing a Chinese character into a Cangjie code, fitting the Cangjie code into at least one digital code and integrating the digital code into at least one program code; an analyzing module configured for analyzing a sentence state of the target content and providing reference information when analyzing the sentence state, wherein the sentence state comprises grammar; and a comprehending module in communication with the identifying module and the analyzing module for parsing the target content via a predefined article mode that includes at least one of an article style, a word count, a paragraph count, a sentence count and a critical element.

In an embodiment, the digital code includes at least one word in a hexadecimal format.

In an embodiment, the digital code is converted into the program code by a carrying method. In another embodiment, the carrying method involves conversion between two of a binary format, an octal format, a decimal format and a hexadecimal format.

In an embodiment, the abnormal phrase is a phonetic character or a typo.

In an embodiment, the inappropriate punctuation mark includes misuse and missing.

In an embodiment, the comprehending module selects the predefined article mode according to grades.

In an embodiment, the comprehending module is further configured for comprehending the target content.

In an embodiment, the predefined article mode further comprises a special phrase.

In an embodiment, the Chinese composition reviewing system further comprises a scoring module in communication with the comprehending module for calculating a score of the target content according to an identifying result of the identifying module, a processing result of the analyzing module, and an analysis result of the comprehending module.

It is known from the above that in the Chinese composition reviewing system according to the present disclosure, the identifying module, the analyzing module and the comprehending module allow compositions to be graded under the same standard automatically. Compared with the prior art, the Chinese composition reviewing system according to the present disclosure can give the compositions fair grades even if the number of the compositions under review is great.

DETAILED DESCRIPTION

The following illustrative embodiments are provided to illustrate the disclosure of the present disclosure, these and other advantages and effects can be apparently understood by those in the art after reading the disclosure of this specification. The present disclosure can also be performed or applied by other different embodiments. The details of the specification may be on the basis of different points and applications, and numerous modifications and variations can be devised without departing from the spirit of the present disclosure.

The terminology used herein is for the purpose of describing particular devices and methods only and is not intended to be limiting of this disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof.

Figure 1:
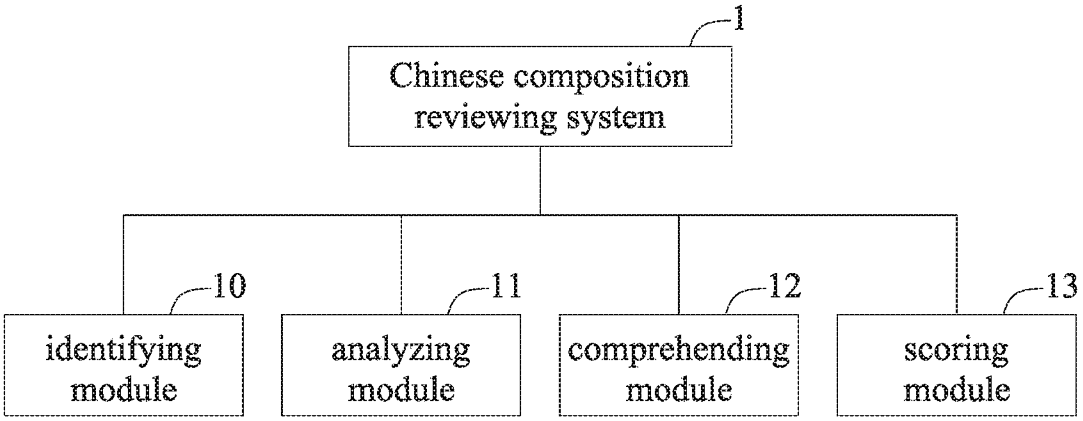
FIG. 1 is a functional block diagram of a Chinese composition reviewing system according to the present disclosure.

Refer to FIG. 1, which is a functional block diagram of a Chinese composition reviewing system 1 based on the modern Chinese characters according to the present disclosure.

The Chinese composition reviewing system 1 is a computer system operating based on artificial intelligence, and comprises an identifying module 10, an analyzing module 11, a comprehending module 12 and a scoring module 13.

The identifying module 10 identifies an abnormal phrase and an inappropriate punctuation mark.

In an embodiment, the abnormal phrase is a phonetic character or a typo. In an embodiment, "帶" is mistyped into a "dal," a Roman phonetic character, and the identifying module 10 will identify the typo and change it to "帶." In another embodiment, a phrase "潔白無瑕" is mistyped into "潔白無瑕," the identifying module 10 identifies the typo "暇" and corrects it to "瑕."

In an embodiment, the inappropriate punctuation mark includes misuse and missing. In another embodiment, a period "." is mistyped into a semicolon ";", and the identifying module 10 identifies the typo ";" and changes it to "." automatically. In yet another embodiment, only an opening quotation mark appears, with a closing quotation mark omitted, and the identifying module 10 identifies and adds the missing closing quotation mark automatically.

The identifying module 10 translates word information into Cangjie codes. The computer system reads the Chinese character. In an embodiment, the word information includes at least one Chinese character, such as a single Chinese character or a phrase including a plurality of Chinese characters (e.g., a string of words).

The Cangjie code is a well-known Chinese character coding input method, and was published in 1976. The Cangjie code classifies Chinese characters based on basic elements, which correspond to English letters, as shown in the following table:

| Classification | Basic Elements |
|---|---|
| Philosophy | 日(A)、月(B)、金(C)、木(D)、水(E)、火(F)、土(G) |
| Stroke | 竹(H)、戈(I)、十(J)、大(K)、中(L)、一(M)、弓(N) |
| Human Body | 人(O)、心(P)、手(Q)、口(R) |
| Character | 尸(S)、廿(T)、山(U)、女(V) |
| Pattern | 田(W)、卜(Y) |

The basic elements of "面" are "一田卜中," and the instruction of Cangjie code that a computer receives is "MWYL." With the rapid development of a modern computer, Cangjie code determines Chinese characters (e.g., traditional or simplified) based on slightly different basic elements. For example, "面" has a coding of "MWYL" (basic elements: 一田卜中) under the 3rd-generation Cangjie code, a coding of "MWSL" (basic elements: 一田尸中) under the 5th-generation Cangjie code, and a coding of "MWS" (basic elements: 一田尸) under the 6th-generation Cangjie code. The Cangjie code inputs the Unicode of the coding, and converts the Unicode into a reading code, which corresponds to a subsequent digital code. For instance, "一" has a Unicode of 4E00, and a reading code of B4808080.

The identifying module 10 fits the Cangjie code into conceptive information that includes at least one digital code. After the Cangjie code (MWYL) is received, all digital codes to which the Cangjie code corresponds will be searched, and the digital codes will be collected to become conceptive information.

The identifying module 10 fits the Cangjie code into a digital code according to a conceptive classification method, which classifies Chinese characters and Chinese phrases based on different attributes. The Chinese characters are defined with 1,024 genes (one type of Chinese character genes is shown in the following table), and the conceptive classification method classifies the 1024 Chinese character genes into five levels (i.e., standpoint, phenomenon, recognition, classification and item) to define 255 conceptive options, and encodes these 255 conceptive options in a hexadecimal format (00-FF) ("00" does not relate to any conceptive option), allowing the digital code to include at least one word that is in a hexadecimal format (00-FF).

| Everyday Radicals | Chinese Character Gene |
|---|---|
| Plant | 米, 禾, 黍, 麦, 竹, 艸 |
| Nature | 日, 月, 金, 木, 水, 火, 土, 风, 阜, 玉, 雨, 石, 气, 山 |
| Animal | 贝, 牛, 鸟, 犬, 鹿, 虫, 豕, 鱼, 龟, 人, 隹, 马, 羊, 鼠 |
| Behavior | 走, 彳, 斗, 食, 入, 言 |
| Body | 骨, 目, 韦, 舌, 爪, 毛, 身页, 角, 肉, 心, 手, 口, 足尸, 髟, 耳, 羽, 革 |
| Environment | 囗, 穴, 厂, 邑, 田 |
| Color | 赤, 白, 黑 |
| Human-Made | 门, 皿, 鼓, 舟, 斤, 殳臼, 车, 巾, 酉, 瓦, 弓, 夂缶, 耒, 刀, 糸, 衣 |
| Recognition | 鬼, 力, 片, 示, 歹, 子女, 止, 方 |

For instance, the Chinese character "車" is defined with three Chinese character genes, which represent a conceptive option of "vehicle," which is defined with a digital code "6D." Since "vehicle" includes a variety of options, such as ships, boats etc., the digital code is further defined with a plurality of words, each of which represents a meaning. For instance, the digital code "59" of a single word represents a generic meaning of birds, the digital code "59 10" of two words represented a restricted meaning of "birds that cannot fly," and the digital code "59 00 00 00" of four words represents a precise meaning of "birds."

In the digital code "59 00 00 00" of four words, the first word "59" represents a gross classification (the above conceptive options are classified into nouns represented by 00-7F, adjectives represented by 80-A7, and verbs represented by A8-FF), the second word "00" represents a subclassification (i.e., one item in the representative parts of speech), the third word "00" and the fourth words "00" represent reserved words (which are codes augmented based on the definitional demands of Chinese characters). A digital code can include any number of words based on demands.

A Chinese character may have a variety of digital codes based on its usage. For instance, "行" can be defined with as many as 15 digital codes, and the conceptive information of "行" includes 15 digital codes.

The identifying module 10 calculates the digital code to get a program code, and uses a carrying method to change the digital code into the program code. The carrying method converts a code in a hexadecimal format into another code in a binary format, and converts each word of the digital code into a program code in the binary format. For instance, if the digital code is "59 00 00 00," the first word "59" is converted into a first program code of "0101 1001," the second word "00" is converted into a second program code of "00000000," the third word "00" is converted into a third program code of "00000000," and the fourth word "00" is converted into a fourth program code of "00000000."

The analyzing module 11 analyzes and processes a sentence state that includes grammar.

In an embodiment, the grammar takes a database established by the Chinese composition reviewing system 1 as processing principles. The database includes a variety of erroneous grammars, including misused nouns, indefinite or inappropriate reference, misused verbs, misused adjective, misused adverbs, misused prepositions, misused conjunctions, misused particles, misused interjections, misused measures, contradictory articles, conjunction missing, adverb missing, time adverb missing, missing words, inappropriate functional words, inappropriate idioms, repetitive phrases, rhetoric reference, inappropriate opening phrases, component surplus, inappropriate titles, lacking directional phrases, contradictory color, made-up phrases, inappropriate praise and derogatory, inappropriate phrase sequence, inappropriate negative, contradictory conceptions, unclear conceptions, inappropriate classification, inappropriate set conception usage, inappropriate one side in association with two sides, disorderly sentence, inappropriate numerals or lacking logics, out of logic, erroneous homonyms, lacking plural forms, lacking articles, lacking subject terms, lacking predicates, lacking objects, lacking attitudes, lacking adverbial modifiers, lacking complements, inappropriate subject predicate matching, inappropriate predicate object matching, inappropriate attribute center matching, inappropriate state center matching, inappropriate predicate complement matching, inappropriate corelative matching, inappropriate subject object matching, etc.

The analyzing module 11, which analyzes and processes the sentence state, provides reference information. In an embodiment, when processing a phrase "張三興高采烈的叫道," the analyzing module 11 determines that "的" is an inappropriate article (i.e., an erroneous part of speech), and will provide "地," which is a correct article, as the reference information. In another embodiment, when processing a phrase "他迫不及待地插上一句話," the analyzing module 11 determines that "插" is an inappropriate verb, and will provide "補," which is a correct verb, as the reference information.

The comprehending module 12 analyzes and parses the target content via a predefined article mode.

In an embodiment, the comprehending module 12 selects a predefined article mode in the database established in the Chinese composition reviewing system 1 based on grades, which are classified into elementary school, junior high school, senior high school, college etc. based on the level of education of a writer.

The predefined article mode includes article styles, such as narrative, sentimental, descriptive, argumentation, practical writing articles. The details of the article style include fable, fantasy, future styles etc. The comprehending module 12 sets the type of the article style based on titles, and selects an appropriate predefined article mode. If the title cannot set the article style, the comprehending module 12 will glance at the target content first, and then set the type of the article style and select an appropriate predefined article mode.

The predefined article mode includes critical elements, such as subjects (e.g., who, what, how etc.), plots, backgrounds (e.g., imagination, observation, feeling etc.), words used, form selected, beginning and ending, layers, layout, transition etc. The predefined article mode further comprises special phrases, such as idioms, classics quoted, proverbs etc.

The predefined article mode also includes a word count, a sentence count, a paragraph count etc. For instance, the predefined article mode sets 500 words, 50 sentences and three paragraphs for a writer of an elementary school level, 1,000 words, 100 sentences and five paragraphs for a writer of a junior high school level, etc. The article style is set to include 1,000 words for a descriptive article, 2,000 words for a sentimental article, four paragraphs for a descriptive article, six paragraphs for a sentimental article, 200 sentences for a descriptive article, 400 sentences for a sentimental article, etc.

The scoring module 13 calculates the score of the target content according to an identifying result of the identifying module 10, a processing result of the analyzing module 11, and an analysis result of the comprehending module 12. In an embodiment, the scoring module 13 can set an initial score (a basic score of 60 points), and increment or decrement the initial score according to the identifying result of the identifying module 10, the processing result of the analyzing module 11, and the analysis result of the comprehending module 12. The more the number of abnormal phrases and inappropriate punctuation marks that the identifying module 10 identifies is, the more points the initial score are decremented becomes. The more the number of the reference information provided by the analyzing module 11 when processing the sentence state is, the more points the initial score are decremented by the scoring module 13 becomes. If the comprehending module 12 analyzes and gets a special phrase, the scoring module 13 is incremented.

The comprehending module 12 can increment or decrement the initial score based on overall evaluation, sentence evaluation and paragraph evaluation as follows:

| Item | Sub-item | Score | Descriptions |
|---|---|---|---|
| Overall Evaluation | Subject | 5 | Decrementing at most a half of the initial score |
| | Subject Matter | 5 | Decrementing at most a half of the initial score |
| | Structure | 5 | Including beginning, ending, layers, layout and transition |
| | Plot | 5 | Decrementing at most a half of the initial score |
| | Content | 5 | Decrementing at most a half of the initial score |
| | Observation | 3 | Including imagination |
| | Feeling | 3 | |
| | Expression | 3 | Including who, how, what, where etc. |
| | Argument | 3 | |
| | Phrase | 3 | Setting the upper limit of the sentence count, such as eight sentences, over which the initial score will be decremented |
| Sentence Evaluation | Beautiful sentence | 1 | |
| | Basic | 1 | |
| Paragraph Evaluation | Basic | 1-2 | |

Figure 2:
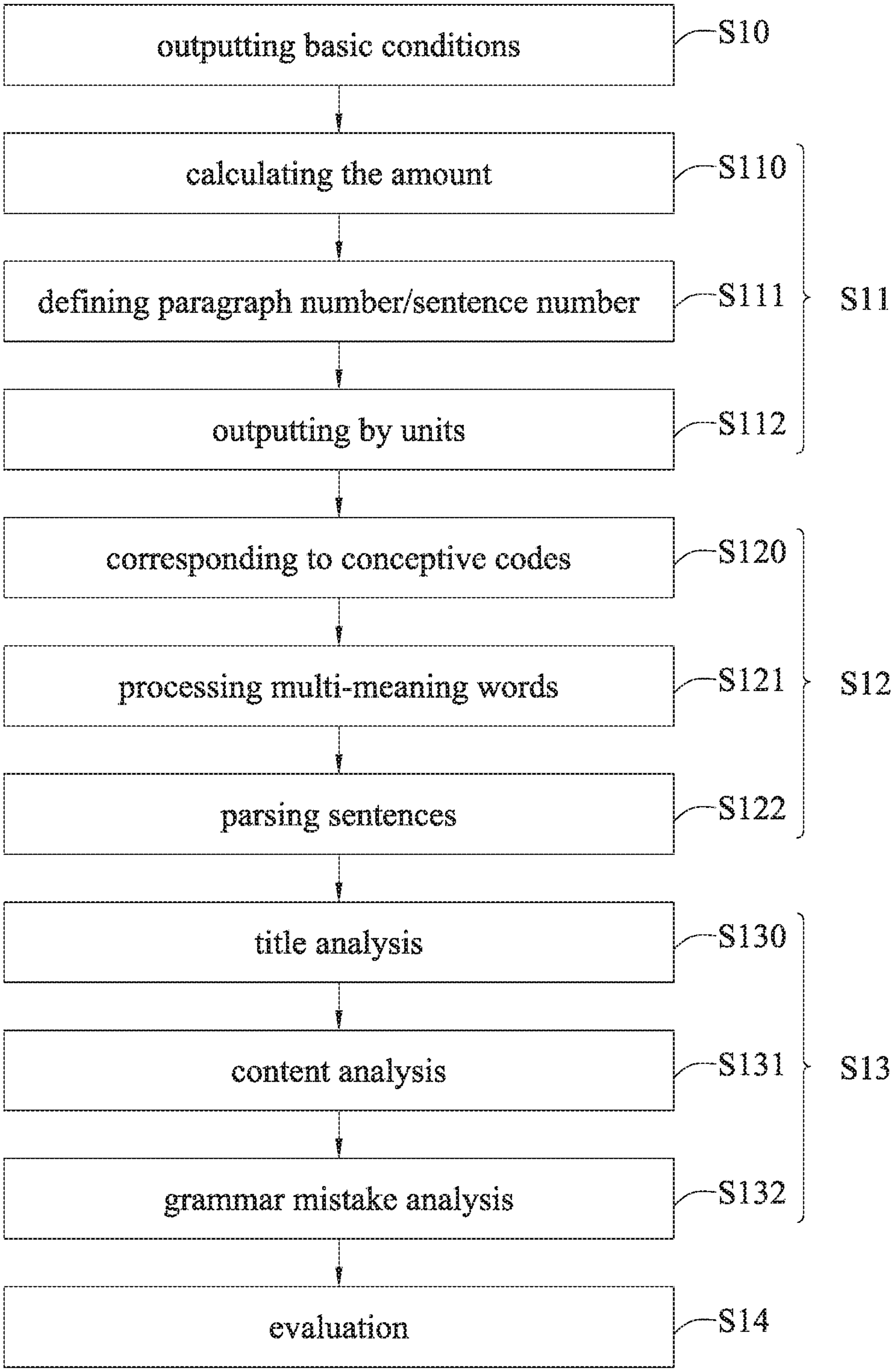
FIG. 2 is a flow chart illustrating the operation of the Chinese composition reviewing system of FIG. 1.

FIG. 2 is a flow chart illustrating the operation of Chinese composition reviewing system 1 according to the present disclosure.

The operation of the Chinese composition reviewing system 1 includes an initial stage S10, a setting stage S11, a processing stage S12, an analyzing stage S13 and a scoring stage S14 subsequently.

In the initial stage S10, basic conditions, such as grades (elementary school, junior high school etc.), title, and target contents (an article to be scored), are input to the scoring module 13.

In the setting stage S11, the scoring module 13 performs corresponding processes.

In an embodiment, the scoring module 13 calculates a word count, a paragraph count, a sentence count of the target content, a sentence count of a dialogue of the paragraphs, and other numeral parameters in step S110.

In step S111, the scoring module 13 defines the current paragraph number and sentence number of the target content. In step S112, the target content is input to the identifying module 10, the analyzing module 11 and the comprehending module 12 sentence by sentence.

In the processing stage S12, the analyzing module 11 processes words, phrases and sentences.

In an embodiment, in the processing stage S12 in step S120 each word in a phrase corresponds to a conceptive code that is arranged with English numerals based on a certain rule and represents a single Chinese character. In step S121, multi-meaning words are processed based on front and rear phrases of a sentence. For instance, "課" has five meanings, the correct one of which is determined based on the sentence "我的課餘生活" In step S122, the sentence is parsed, to set the grammar parameters, such as the subject, predicate, object, attribute, state, complement etc., and the comprehending module 12 is entered.

In the analyzing stage S13, the identifying module 10, the analyzing module 11 and the comprehending module 12 perform corresponding processes, such as title analysis (step S130), content analysis (step S131) and grammar mistake analysis (step S132).

In the title analysis, an article style is set based on the title (and is further identified based on the target content).

In an embodiment, the comprehending module 12 sets the title core (critical characters) and compares the predefined article mode with the target content in step S130. For instance, based on the conceptive codes, such as the critical characters "爸," "爹," "父," and "家嚴," the first two codes are 2908H, 08H of which represents one in a family tree elder than "我."

In step S130, the comprehending module 12 actuates corresponding buffers designed based on the predefined article mode. For a title "我的英語老師," a character attribute buffer is actuated that includes a variety of parameters, such as appearance, aspiration, character, preference, occupation, special skill, family, interpersonal relationship etc. For a title "生命生命讀後感," a knowledge learned from reading buffer is actuated that includes a plurality of parameters, such as reasons why a book is obtained, the reading motivation, summary, realization of the knowledge learned from reading, a subject description, subject association etc.

In the content analysis, the corresponding buffers actuated based on the titles are used as the evaluation standards.

In an embodiment, the comprehending module 12 analyzes and evaluates the item to be evaluated in the predefined article mode, such as an article style, a critical element and a special phrase, in step S131.

For instance, with regard to the article style, the article system set by a title "我的課 餘生活" is a descriptive article, and details the life. If the target content describes "溜冰" and the last paragraph states "溜冰不僅使我學到了技術，而且給了我寶貴的經驗," the comprehending module 12 determines that the target content is irrelevant to the "課餘生 活" based on the predefined article mode, and evaluates it to be "inappropriate subject selection."

If the article style is an argumentation article, the buffers of checking the argumentation points, evidences and articulation are actuated as follows:

| article style of predefined article mode | target content |
|---|---|
| argumentation points | Parents love their children. |
| evidence | Generally, parents will not harm their children. |
| articulation | Many criticizers, few doers. |

If the article style is a practical writing, such as a letter, a letter format is actuated, to check if the target content complies with a variety of parameters, such as appellation, greeting words, main text, praying words, signature, date etc.

For an article style having "過程," the predefined article mode includes parameters of critical elements corresponding to the processes and plots. For an article entitled "大條麵," a dining in a restaurant process of the predefined article mode is actuated based on the target content, including entering the restaurant, menu, ordering, serving, eating, checking and leaving the restaurant subsequently, and checks the target content based on the processes as follows:

| The process of predefined article mode | the target content |
|---|---|
| Entering the restaurant | Walk to the restaurant. |
| Menu | |
| Ordering | I order two bowls of noodle. |
| Serving | The noodle is served. |
| Eating | I pick up the noodle. |
| Checking | |
| Leaving the restaurant | In walk out of the noodle restaurant. |

Therefore, the target content mentions five of the seven processes in the predefined article mode, and the comprehending module 12 determines the process of the target content is substantially complete. The setting of the processes will affect the parameters of critical elements, such as the layout and plots of the predefined article mode.

The predefined article mode can set hints and correlations based on demands as follows:

| Title | Where the hints come from | The phrase of the hints | Where the correlations come from | The phrase of the correlations |
|---|---|---|---|---|
| Man should be modest. | The second sentence in the second paragraph | 我當時高興地昏了頭，忘了母親的交待 | The seventh sentence in the second paragraph | 不過考試結果出來，我卻不及格 |

The predefined article mode includes a variety of parameters, such as a background (e.g., imagination, observation, feeling etc.), words used, etc. For an article "我的 小堂妹," a strength weakness buffer is actuated (the strength includes love to help people, adorable, kind, intelligent, optimism etc.). If the first paragraph of the target content includes the sentence "在家裡她可是個小 可愛," the comprehending module 12 determines that the target content includes the strength based on the predefined article mode. For an article entitled "我家的電冰箱", an object characteristic buffer is actuated based on the conceptive code "7D010316H" of a refrigerator, which includes a plurality of parameters, such as shape, size, color, material, structure, function, operation, feeling etc. as follows:

| Parameters of predefined article mode | the target content |
|---|---|
| Shape | |
| Size | Two levels, taller than I |
| Color | It is white |
| Material | |
| Structure | The upper level is a freezing chamber, and the lower level is a cooling chamber |
| Function | |
| Operation | Open the cooling chamber, and put a watermelon into it |
| Feeling | I love refrigerator |

Therefore, the target content complies with the majority of the parameters of the predefined article mode, and the comprehending module 12 determines that the target content is substantially complete.

In the grammar mistake analysis, the identifying module 10 and the analyzing module 11 perform the corresponding processes.

In an embodiment, in addition to the identifying module 10, the analyzing module 11 processes the grammar in step S132 as follows:

| predefined article mode | target content |
|---|---|
| 快要絕望、<br>響起一陣聲音 | 當我要絕望時,<br>耳邊響了一陣聲音 |

Therefore, the target content lacks an adverb "快" and a complement "起," and the analyzing module 11 will provide a correct grammar as the reference information.

In the scoring stage S14, the scoring module 13 performs the corresponding processes.

In an embodiment, the scoring module 13 calculates the score of the target content according to the identifying result of the identifying module 10, the processing result of the analyzing module 11, and the analysis result of the comprehending module 12, increments and decrements the initial score based on the overall evaluation, the paragraph evaluation and the sentence evaluation, and displays the overall evaluation, the paragraph evaluation and the sentence evaluation on demands for the writer's reference.

In the Chinese composition reviewing system 1 according to the present disclosure, the identifying module 10, the analyzing module 11 and the comprehending module 12 review the target content based on the same standard automatically. Compared with the prior art, the Chinese composition reviewing system 1 according to the present disclosure can review a great number of compositions based on the same standard, and the scoring module 13 can give these compositions fair scores and ranks.

The foregoing descriptions of the detailed embodiments are only illustrated to disclose the features and functions of the present disclosure and not restrictive of the scope of the present disclosure. It should be understood to those in the art that all modifications and variations according to the spirit and principle in the disclosure of the present disclosure should fall within the scope of the appended claims.

What is claimed is:

1. A Chinese composition reviewing system, comprising:

an identifying module configured for identifying an abnormal phrase and an inappropriate punctuation mark of a target content by dividing a Chinese character into a Cangjie code, fitting the Cangjie code into at least one digital code and integrating the digital code into at least one program code;

an analyzing module configured for analyzing a sentence state of the target content and providing reference information when analyzing the sentence state, wherein the sentence state comprises grammar; and a comprehending module in communication with the identifying module and the analyzing module for parsing the target content via a predefined article mode including at least one of an article style, a word count, a paragraph count, a sentence count and a critical element.

2. The Chinese composition reviewing system of claim 1, wherein the digital code includes at least one word in a hexadecimal format.

3. The Chinese composition reviewing system of claim 1, wherein the digital code is converted into the program code by a carrying method.

4. The Chinese composition reviewing system of claim 3, wherein the carrying method involves conversion between two of a binary format, an octal format, a decimal format and a hexadecimal format.

5. The Chinese composition reviewing system of claim 1, wherein the abnormal phrase includes a phonetic character and a typo.

6. The Chinese composition reviewing system of claim 1, wherein the inappropriate punctuation mark represents misused and missing punctuation marks.

7. The Chinese composition reviewing system of claim 1, wherein the comprehending module selects the predefined article mode according to grades.

8. The Chinese composition reviewing system of claim 1, wherein the comprehending module is further configured for comprehending the target content.

9. The Chinese composition reviewing system of claim 1, wherein the predefined article mode further comprises a special phrase.

10. The Chinese composition reviewing system of claim 1, further comprising a scoring module in communication with the comprehending module for calculating a score of the target content according to an identifying result of the identifying module, a processing result of the analyzing module, and an analysis result of the comprehending module.

* * * * *